(12) United States Patent
Mendes et al.

(10) Patent No.: US 9,103,368 B2
(45) Date of Patent: Aug. 11, 2015

(54) LOCKING HINGE MECHANISM FOR A COLLAPSIBLE PLAY YARD FRAME

(75) Inventors: Mark Mendes, Loganville, GA (US); Chen Er-Jui, Kauhsiung (TW)

(73) Assignee: Kids II, Inc., Atlanta, GA (US)

( * ) Notice: Subject to any disclaimer, the term of this patent is extended or adjusted under 35 U.S.C. 154(b) by 0 days.

(21) Appl. No.: 13/605,233

(22) Filed: Sep. 6, 2012

(65) Prior Publication Data

US 2013/0074257 A1    Mar. 28, 2013

Related U.S. Application Data

(60) Provisional application No. 61/531,829, filed on Sep. 7, 2011.

(51) Int. Cl.
*A47D 7/00* (2006.01)
*F16C 11/10* (2006.01)
*A47D 13/06* (2006.01)

(52) U.S. Cl.
CPC ............ *F16C 11/10* (2013.01); *A47D 13/061* (2013.01); *A47D 13/063* (2013.01); *Y10T 16/5407* (2015.01)

(58) Field of Classification Search
CPC ....... A47D 13/063; A47D 7/04; A47D 7/002; A47D 13/06; A47D 13/061; A47D 15/008
USPC ........... 5/99.1, 102, 125, 136, 149, 174, 98.1; 403/91–103; 16/319, 321, 323, 324, 16/326, 327, 332, 349, 352, 366, 370, 371
See application file for complete search history.

(56) References Cited

U.S. PATENT DOCUMENTS

| | | | |
|---|---|---|---|
| 4,070,716 A | 1/1978 | Satt et al. | |
| 5,293,656 A | 3/1994 | Chan | |
| 5,353,451 A * | 10/1994 | Hsiung | ............................ 5/99.1 |
| 5,358,220 A | 10/1994 | Yu-Kuang | |
| 5,367,725 A | 11/1994 | Tsai | |
| 5,446,931 A | 9/1995 | Wei | |
| 5,485,655 A * | 1/1996 | Wang | ............................. 16/371 |
| 5,504,951 A | 4/1996 | Yeh | |
| 5,530,977 A * | 7/1996 | Wang | ............................. 5/99.1 |
| 5,560,055 A | 10/1996 | Ziegler | |
| 5,581,827 A | 12/1996 | Fong et al. | |
| 5,611,634 A * | 3/1997 | Wang | ............................ 403/102 |
| 5,697,111 A | 12/1997 | Dillner et al. | |
| 5,727,265 A | 3/1998 | Ziegler et al. | |
| 5,730,542 A * | 3/1998 | Cheng | ............................ 403/102 |

(Continued)

*Primary Examiner* — Timothy D Collins
*Assistant Examiner* — Richard G Davis
(74) *Attorney, Agent, or Firm* — Gardner Groff Greenwald & Villaneuva, PC

(57) ABSTRACT

A folding playpen or play yard frame and/or a locking hinge mechanism for a folding playpen or play yard frame of the type having tubular rails for supporting sides and a floor of the playpen or play yard. The locking hinge mechanism includes a housing and a lock assembly movably mounted to the housing. The lock assembly is pivotally attached to proximal portions of the tubular rails for locking and unlocking the rails relative to the housing. The lock assembly and housing are configured and adapted to require the locking hinge assembly to be lifted to effect limited relative motion between the housing and the proximal portions of the tubular rails prior to unlocking the lock assembly and permitting greater relative motion between the housing and proximal portions of the tubular rails. This provides greater safety against the hinge accidentally being folded or being folded by a child.

20 Claims, 10 Drawing Sheets

(56) References Cited

U.S. PATENT DOCUMENTS

| | | | |
|---|---|---|---|
| 5,745,954 A * | 5/1998 | Shogan et al. | 16/343 |
| 5,761,755 A * | 6/1998 | Huang | 5/99.1 |
| 5,819,342 A | 10/1998 | Williams | |
| 5,826,285 A * | 10/1998 | Mariol et al. | 5/99.1 |
| 5,857,229 A * | 1/1999 | Magnani, Jr. | 5/99.1 |
| 5,867,851 A | 2/1999 | Mariol et al. | |
| 5,904,344 A | 5/1999 | Pope et al. | |
| 5,906,013 A * | 5/1999 | Wang | 5/99.1 |
| 5,963,996 A | 10/1999 | Hsia | |
| 5,970,540 A | 10/1999 | Cheng | |
| 5,988,928 A | 11/1999 | Cheng | |
| 6,082,922 A | 7/2000 | Cheng | |
| 6,125,483 A * | 10/2000 | Stroud et al. | 5/99.1 |
| 6,148,456 A | 11/2000 | Tharalson et al. | |
| 6,250,837 B1 | 6/2001 | Mariol et al. | |
| 6,256,814 B1 | 7/2001 | Drobinski | |
| 6,295,667 B1 | 10/2001 | Cheng | |
| 6,305,037 B1 | 10/2001 | Cheng | |
| 6,308,352 B1 | 10/2001 | Cheng | |
| 6,336,234 B1 | 1/2002 | Kuo | |
| 6,385,800 B1 | 5/2002 | Chen et al. | |
| 6,421,850 B1 | 7/2002 | Welsh, Jr. | |
| 6,470,515 B1 | 10/2002 | Hsia | |
| 6,510,568 B1 | 1/2003 | Drobinski et al. | |
| 6,665,895 B1 | 12/2003 | St. Pierre et al. | |
| 6,729,791 B1 | 5/2004 | Chen | |
| 6,735,796 B2 | 5/2004 | Warner, Jr. et al. | |
| 6,851,135 B1 | 2/2005 | Chen | |
| 6,915,545 B2 * | 7/2005 | Chen | 16/297 |
| 7,131,166 B2 | 11/2006 | Cohen et al. | |
| 7,343,634 B2 | 3/2008 | Song | |
| 7,418,745 B2 | 9/2008 | Paesang et al. | |
| 7,434,279 B2 | 10/2008 | Chen et al. | |
| 7,552,487 B2 | 6/2009 | Chen | |
| 7,568,242 B2 | 8/2009 | Troutman | |
| 7,568,243 B2 | 8/2009 | Gehr et al. | |
| 7,574,757 B2 | 8/2009 | Song | |
| 7,591,031 B2 | 9/2009 | Yang | |
| 7,617,550 B2 | 11/2009 | Gehr et al. | |
| 7,836,530 B2 | 11/2010 | Thorne et al. | |
| 8,387,178 B2 | 3/2013 | Rivera et al. | |
| 2007/0017025 A1 * | 1/2007 | Myer | 5/99.1 |
| 2008/0127412 A1 * | 6/2008 | Pleiman et al. | 5/99.1 |

* cited by examiner

LOCKING HINGE MECHANISM FOR A COLLAPSIBLE PLAY YARD FRAME

CROSS-REFERENCE TO RELATED APPLICATION

This application claims the priority benefit of U.S. Provisional Patent Application Ser. No. 61/531,829 filed Sep. 7, 2011, the entirety of which is hereby incorporated herein by reference for all purposes.

TECHNICAL FIELD

The present invention relates generally to the field of folding playpens and folding play yards, and more particularly to a locking hinge for such folding playpens and folding play yards.

BACKGROUND

Folding playpens and folding play yards are used with children and in recent years, there has been an ever increasing concern for improving the safety of such. One way of addressing safety concerns is to make such devices less prone to accidental manipulation or manipulation by the child. In particular, it is desired to make folding playpens and folding play yards less prone to accidental folding up or being caused to be folded up by the child within or near the folding playpens and folding play yards. Accordingly, it can be seen that needs exist for a device to reduce the risk of folding playpens and folding play yards folding up by accident or by interaction with the child.

It is to the provision of a locking hinge assembly meeting these and other needs that the present invention is primarily directed.

SUMMARY OF THE INVENTION

In example embodiments, the present invention provides a locking hinge mechanism for a folding playpen or play yard frame of the type having tubular rails for supporting sides and a floor of the playpen or play yard. The locking hinge mechanism includes a housing and a lock assembly mounted to the housing. The lock assembly is pivotally attached to proximal portions of the tubular rails for locking and unlocking the rails relative to the housing. The lock assembly and the housing are configured and adapted to require the locking hinge assembly to be lifted at least somewhat to effect some limited relative motion between the housing and the proximal portions of the tubular rails prior to unlocking the lock assembly and permitting greater relative motion between the housing and the proximal portions of the tubular rails. This provides greater safety against the hinge accidentally being folded or being folded by a child.

Preferably, the lock assembly includes a lock button which is operable to unlock the lock assembly only when the locking hinge assembly is lifted to effect some limited relative motion between the housing and the proximal portions of the tubular rails and is prevented from unlocking the lock assembly when the locking hinge assembly is not lifted. Preferably, the limited relative motion between the housing and the proximal portions of the tubular rails required prior to unlocking the lock assembly is a limited relative rotation.

Preferably, the lock assembly includes first and second movable portions positioned under the proximal portions of the tubular rails in the locked position, thereby preventing the proximal portions of the tubular rails from downward rotation relative to the housing. Also preferably, the movements of the first and second movable portions of the lock assembly are constrained by first and second slots formed in the housing and the slots are positioned a non-zero angle relative to one another. More preferably, the slots are each positioned at an angle of between about 5 and 20 degrees relative to the horizontal axis of the housing. More preferably, the slots are each positioned an angle of between about 10 and 15 degrees relative to the horizontal axis of the housing.

Optionally, rail inserts are inserted into the proximal ends of the tubular rails and the rail inserts each include a pawl. Preferably the lock assembly includes recesses for releasably capturing the pawls when the lock assembly is locked.

In another preferred form the present invention comprises a locking hinge mechanism for a folding playpen or play yard frame of the type having tubular rails for supporting sides and a floor of the playpen or play yard. In this form, the locking hinge mechanism includes a housing and a lock assembly mounted to the housing and engaged with proximal portions of the tubular rails for locking and unlocking the rails relative to the housing. The lock assembly includes a push button and a movable mechanism including first and second movable portions movable between a locked position in which the movable portions are positioned under the proximal portions of the tubular rails preventing the proximal portions of the tubular rails from downward rotation relative to the housing and an unlocked position in which the movable portions are not under the proximal portions of the tubular rails.

Preferably, the lock assembly includes a spring (or other biasing element) biasing the first and second movable portions toward the locked position, and the lock assembly and the housing are configured and adapted to require the locking hinge assembly to be lifted to provide some clearance to permit the first and second movable portions to be moved from the locked position in which the movable portions are positioned under the proximal portions of the tubular rails to the unlocked position in which the movable portions are not under the proximal portions of the tubular rails.

In another preferred form the present invention relates to a folding playpen or play yard and includes a plurality of tubular rails and side panels and a floor supported by the plurality of tubular rails. A locking hinge mechanism is provided for connecting and folding the tubular rails, with the hinge mechanism including a housing configured and adapted to be connected to the tubular rails and a lock assembly configured and adapted to be pivotally attached to proximal portions of the tubular rails. Preferably the lock assembly is mounted to the housing for locking and unlocking the rails relative to the housing and includes a push button and a movable mechanism including first and second movable portions. The movable portions are movable between a locked position in which the movable portions are positioned under the proximal portions of the tubular rails preventing the proximal portions of the tubular rails from downward rotation relative to the housing and an unlocked position in which the movable portions are not under the proximal portions of the tubular rails. Preferably, the lock assembly includes a spring (or other biasing element) biasing the first and second movable portions toward the locked position. Preferably, the lock assembly and the housing are configured and adapted to require the locking hinge assembly to be lifted to provide some clearance to permit the first and second movable portions to be moved from the locked position in which the movable portions are positioned under the proximal portions of the tubular rails to the unlocked position in which the movable portions are not under the proximal portions of the tubular rails.

Advantageously, when used with folding playpens and folding play yards locking hinges according to the present invention tend to make it less likely that such folding playpens and folding play yards will accidentally fold up or be caused to fold up by interaction with the child. Similarly, folding playpens and folding play yards made according to the invention have similar advantageous attributes. This tends to make such folding playpens and folding play yards safer, both for the children in or near the folding playpens and folding play yards and for the adults supervising the children and setting up and taking down the folding playpens and folding play yards.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In preferred example embodiments, the hinge mechanism is used with a collapsible play yard or playpen, or with other infant/child products as desired. The depicted embodiment of the hinge mechanism includes a plurality of locking elements positioned within a hinge housing and configured to move between a locked position and an unlocked position. As depicted in the figures, when in the locked position, the locking elements engage the frame members and prohibit the frame members from moving to the collapsed orientation. The movement of the locking elements between the locked and unlocked positions is controlled by a user-operated actuator (e.g., a pushbutton or squeeze handle) coupled to the locking elements. In the embodiments depicted herein, the actuator is biased by a spring toward an extended position, which biases the locking elements toward the locked position. A user can unlock the locking elements by lifting the locking hinge slightly and then compelling the actuator to a retracted position. When the user releases the actuator, the actuator is biased back to the extended position and the locking elements are biased back to the locked position.

Figure 2A:
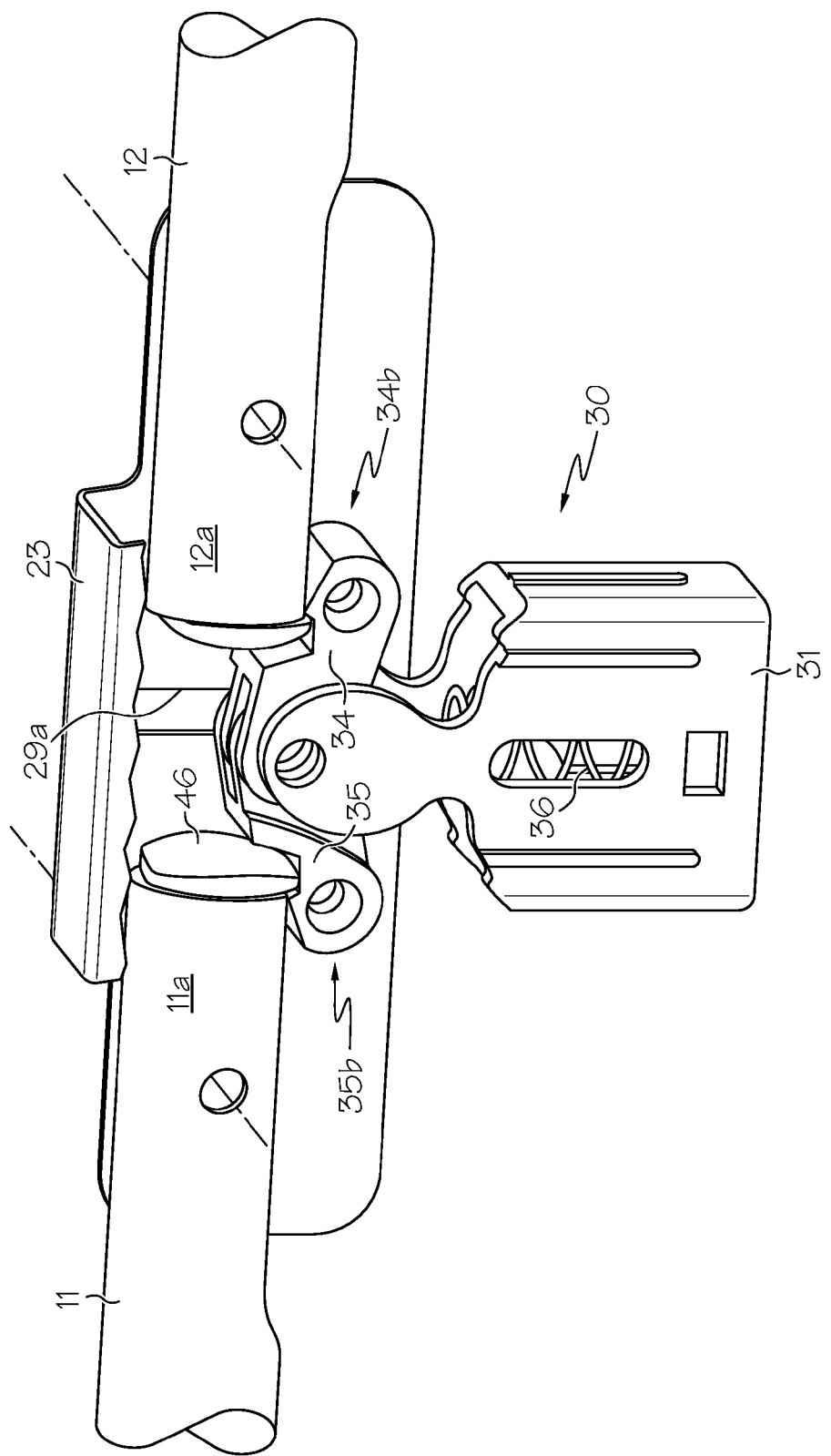
FIG. 2A is a partially cutaway perspective view of the locking hinge mechanism of FIG. 1A, with some items omitted for clarity of illustration, and showing the locking hinge mechanism in a locked position.

In the initial step of unlocking the hinge mechanism the frame members are pivoted slightly upwards at their distal ends, such that the frame members disengage from the locking elements. A user can pivot the frame members upwardly by grasping either the hinge housing or the distal ends of the frame members (rails) and gently pulling upwards. The second step in unlocking the hinge mechanism includes moving the actuator from an extended position to a retracted position by the user. The actuator is coupled to the locking elements such that the locking elements move from the locked position (as shown in FIG. 2A) to an unlocked position (as shown in FIGS. 2C, 2D) as the actuator moves from the extended position to the retracted position. Preferably, the locking elements are configured such that they cannot move to the unlocked position unless the frame members are pivoted upwardly beforehand or concurrently therewith.

Figure 1A:
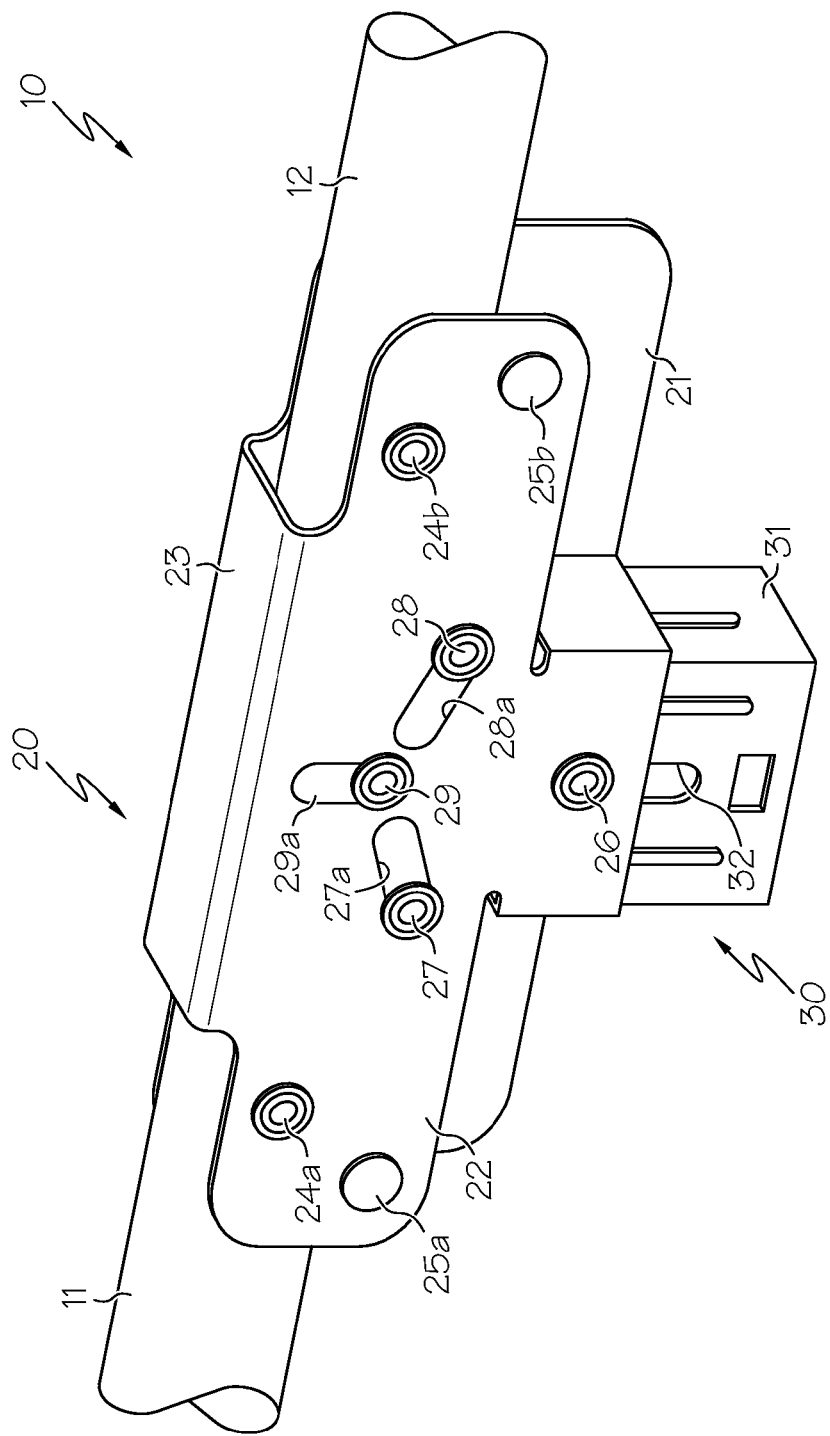
FIG. 1A is a perspective view of a locking hinge mechanism according to an example embodiment of the present invention.

With reference now in more detail to the drawing figures, wherein like reference numbers represent corresponding parts throughout the several views, FIG. 1A shows a locking hinge mechanism 10 for a folding playpen or play yard frame of the type having tubular rails 11, 12 for supporting sides and a floor of the playpen or play yard. The locking hinge mechanism includes a housing 20 and a lock assembly 30 mounted to the housing. The lock assembly 30 is pivotally attached to proximal portions of the tubular rails 11, 12 for locking and unlocking the rails 11, 12 relative to the housing 20. The lock assembly 30 and the housing 20 are configured and adapted to require the locking hinge assembly 10 to be lifted slightly to effect some limited relative motion between the housing 20 and the proximal portions of the tubular rails 11, 12 prior to unlocking the lock assembly 30 and permitting greater relative motion between the housing 20 and the proximal portions of the tubular rails. This provides greater safety against the hinge accidentally being folded or being folded by a child.

Preferably, the lock assembly includes a lock button or user-operated actuator 31 which is operable to unlock the lock assembly 30 only when the locking hinge assembly 10 is lifted slightly to effect some limited relative motion between the housing 20 and the proximal portions of the tubular rails 11, 12 and is prevented from unlocking the lock assembly 30 when the locking hinge assembly 10 is not lifted slightly. Preferably, the limited relative motion between the housing 20 and the proximal portions of the tubular rails 11, 12 required prior to unlocking the lock assembly 30 is a limited relative rotation.

In one form, the housing 20 is formed from sheet metal, folded over into a generally upside-down U shape (when viewed from the end) such that it has a generally rectangular inside face or panel 21, a smaller generally rectangular outside face or panel 22, and a saddle portion 23 connecting the inside and outside panels 21, 22. A lower portion of the outside panel is folded over so that it contacts the inside panel (and is welded thereto) to create a rectangular receptacle within which the lock button 31 is movably received. The inside and outside panels have various slots formed therein for controlling movement of internal parts, as well as round holes for receiving axle pins or control pins therethrough. For example, axle pins 24a, 24b extend through corresponding axle holes formed in the inside and outside panels 21, 22 and through the tubular railings 11, 12 for pivotally connecting the tubular railings 11, 12 to the housing 20. See also FIG. 1B. Limit pins 25a, 25b extend through corresponding axle holes formed in the inside and outside panels 21, 22 and are positioned inboard of and below the axle pins 24a, 24b. The limit pins 25a, 25b are positioned and configured to limit pivotal motion of the tubular railings 11, 12. In particular, these limit pins 25a, 25b limit the upward rotation of the tubular railings 11, 12 (see FIG. 2D).

A lock button guide pin 26 is located in the inside and outside faces and rides in an elongated vertical slot 32 formed in the lock button 31. In this way, the movement of the lock button 31 is constrained in its vertical aspects (how far up and down it can go).

Figure 4A:
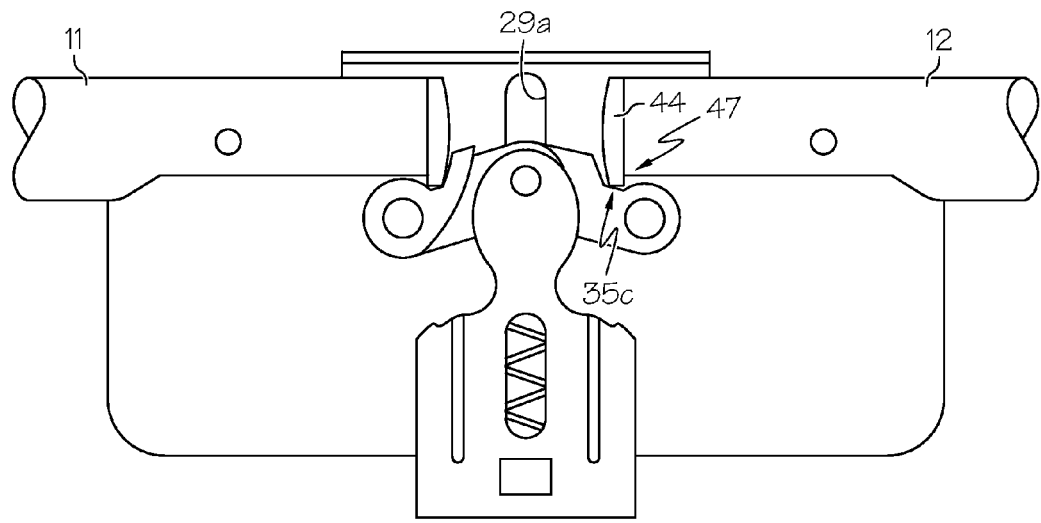
FIG. 4A is a partially cutaway elevation view of the locking hinge mechanism of FIG. 1A, with some items omitted for clarity of illustration, and showing the locking hinge mechanism in a locked position.
Figure 4B:
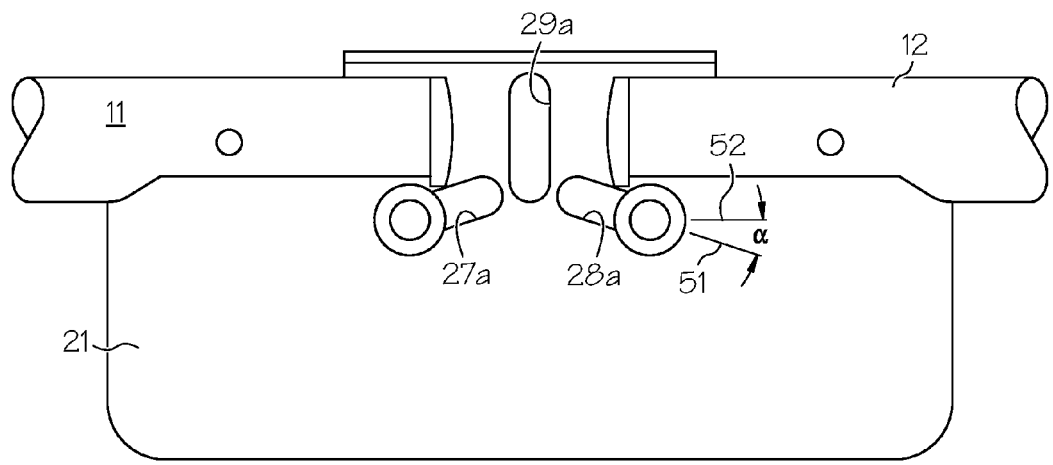
FIG. 4B is a partially cutaway elevation view of the locking hinge mechanism of FIG. 1A, with some items omitted for clarity of illustration, and showing the locking hinge mechanism in a locked position.

A pair of lock pins 27, 28 each extends through the inside and outside panels 21, 22 for movably connecting internal moving parts of the lock assembly 30 to the housing 20, and these lock pins ride in inwardly and upwardly angled slots 27a, 28a which constrain the movement of the lock pins 27, 28 to angled translation. The angle of these slots 27a, 28a preferably is between about 5 and 25 degrees relative to the axis of elongation of the housing or horizontal axis. For example, slot 28a is elongated along axis 51 and is oriented at an angle α with respect to horizontal axis 52 (the longitudinal axis of the housing). Similarly, the slot 27a is angled in a similar fashion, but in a mirror-image manner (these angled slots are symmetrical and at equal angles relative to the horizontal axis 52). More preferably, these slots 27a, 28a are angled between about 10 and 15 degrees relative to the horizontal axis. Most preferably, these slots are angled about 12-13 degrees relative to the horizontal axis. See FIG. 4B. Referring again to FIGS. 1A, 1B, a third lock pin 29 extends through the inside and outside panels 21, 22 for movably connecting more internal moving parts of the lock assembly to the housing 20 and this lock pin 29 rides in a vertical slot 29a which constrains the movement of the lock pin 29 to vertical up and down translation.

Figure 1B:
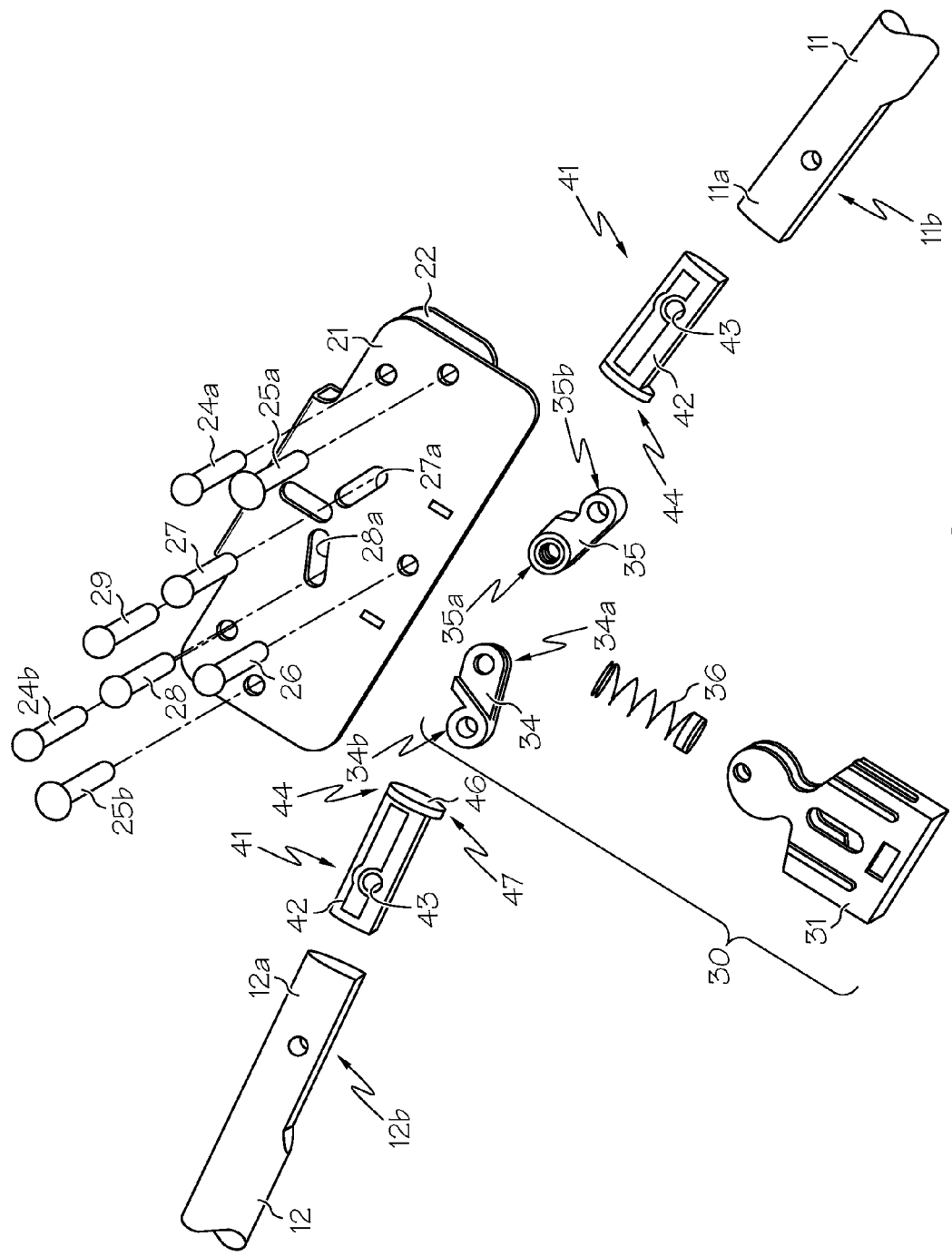
FIG. 1B is an exploded perspective view of the locking hinge mechanism of FIG. 1A.

As best understood from reviewing FIGS. 1B and 2A, preferably, the lock assembly 30 includes the lock button 31, first and second movable arms 34, 35, and a main spring or biasing element 36. The movable arms 34, 35 can be provided by locking elements or movable portions with some structural differences from those depicted but still providing the functionality described herein. The main spring 36 acts to bias the lock button 31 downwardly. Moreover, first and second movable arms 34, 35 and the lock button 31 are interconnected to one another by lock pin 29 extending through each of them. In this regard, these three elements all have a recess or bore formed in end portions thereof through which the lock pin 29 extends. Together, they form a folding A-arm assembly. The upward movement of the lock assembly 30 (the folding A-arm assembly) causes the movable arms 34, 35 to fold toward each other (to collapse the folding A-arm assembly) as the proximal ends 34a, 35a of the arms move upwardly in a vertical direction and the distal ends 34b, 35b move along the angled paths dictated by the angled slots 28a, 27a. To see this folding action most easily, compare the configurations shown in FIGS. 2A, 2B with the configuration shown in FIG. 2C.

Figure 2B:
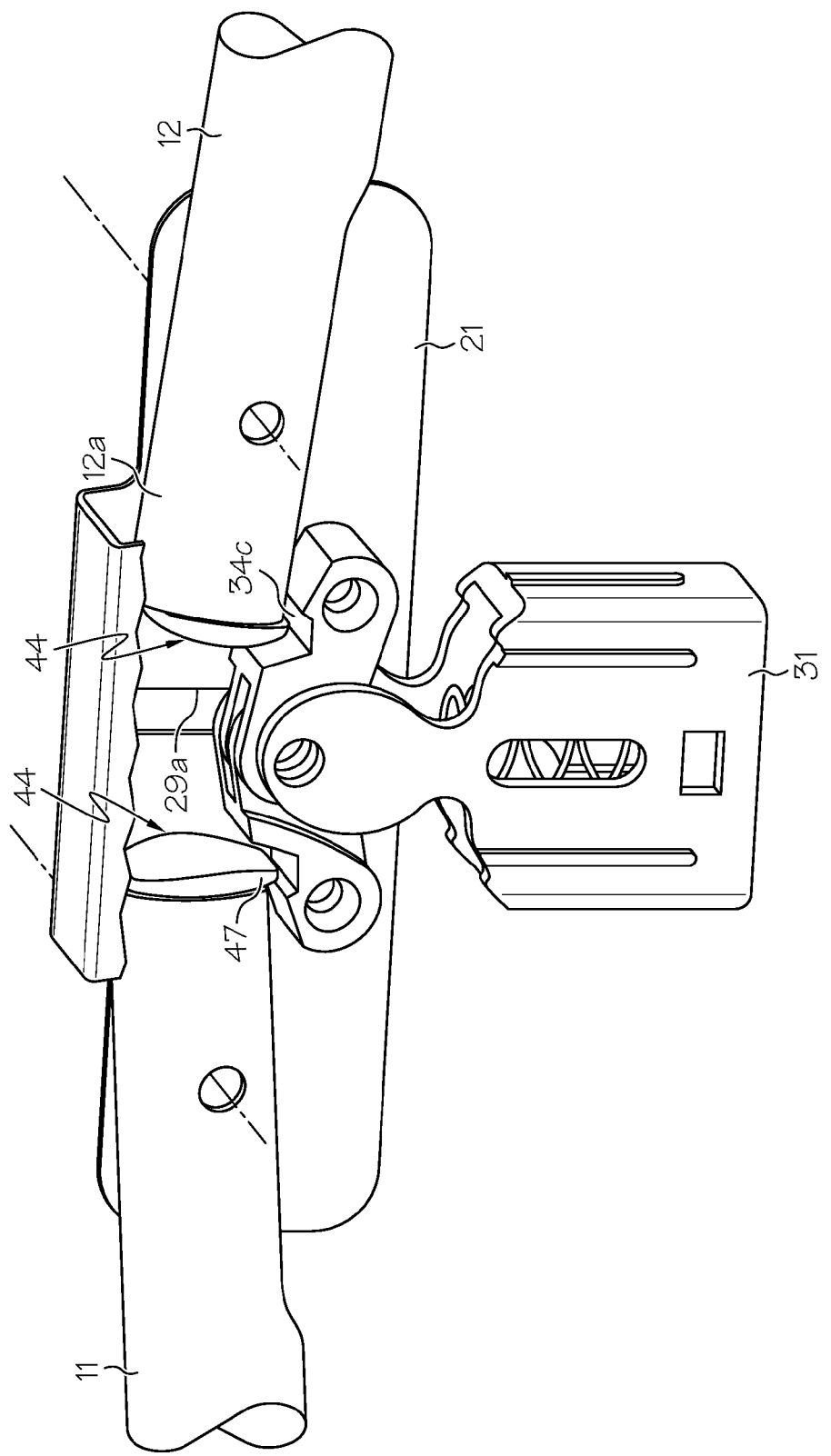
FIG. 2B is a partially cutaway perspective view of the locking hinge mechanism of FIG. 1A, with some items omitted for clarity of illustration, and showing the locking hinge mechanism slightly lifted in preparation for unlocking the hinge mechanism.
Figure 2C:
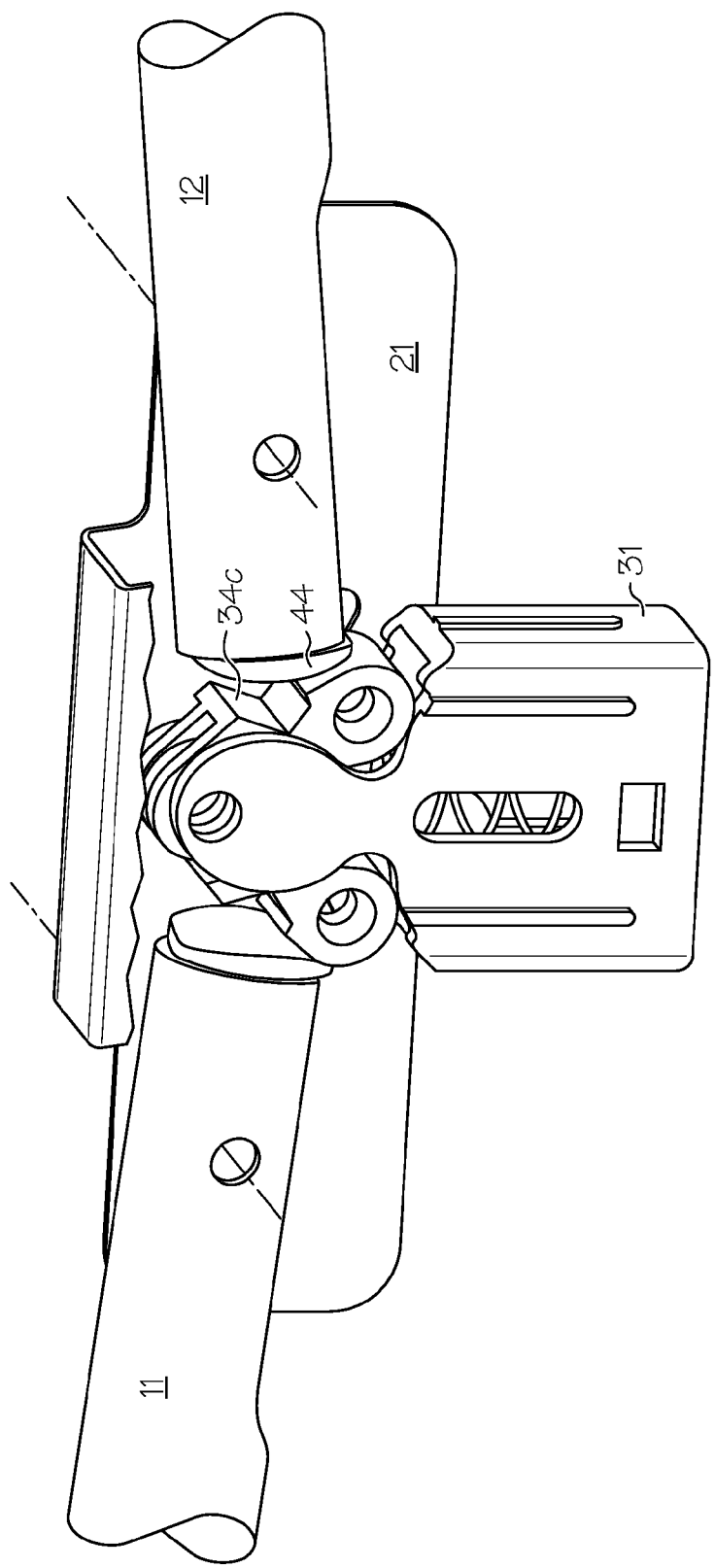
FIG. 2C is a partially cutaway perspective view of the locking hinge mechanism of FIG. 1A, with some items omitted for clarity of illustration, and showing the locking hinge mechanism slightly lifted and unlocked.
Figure 2D:
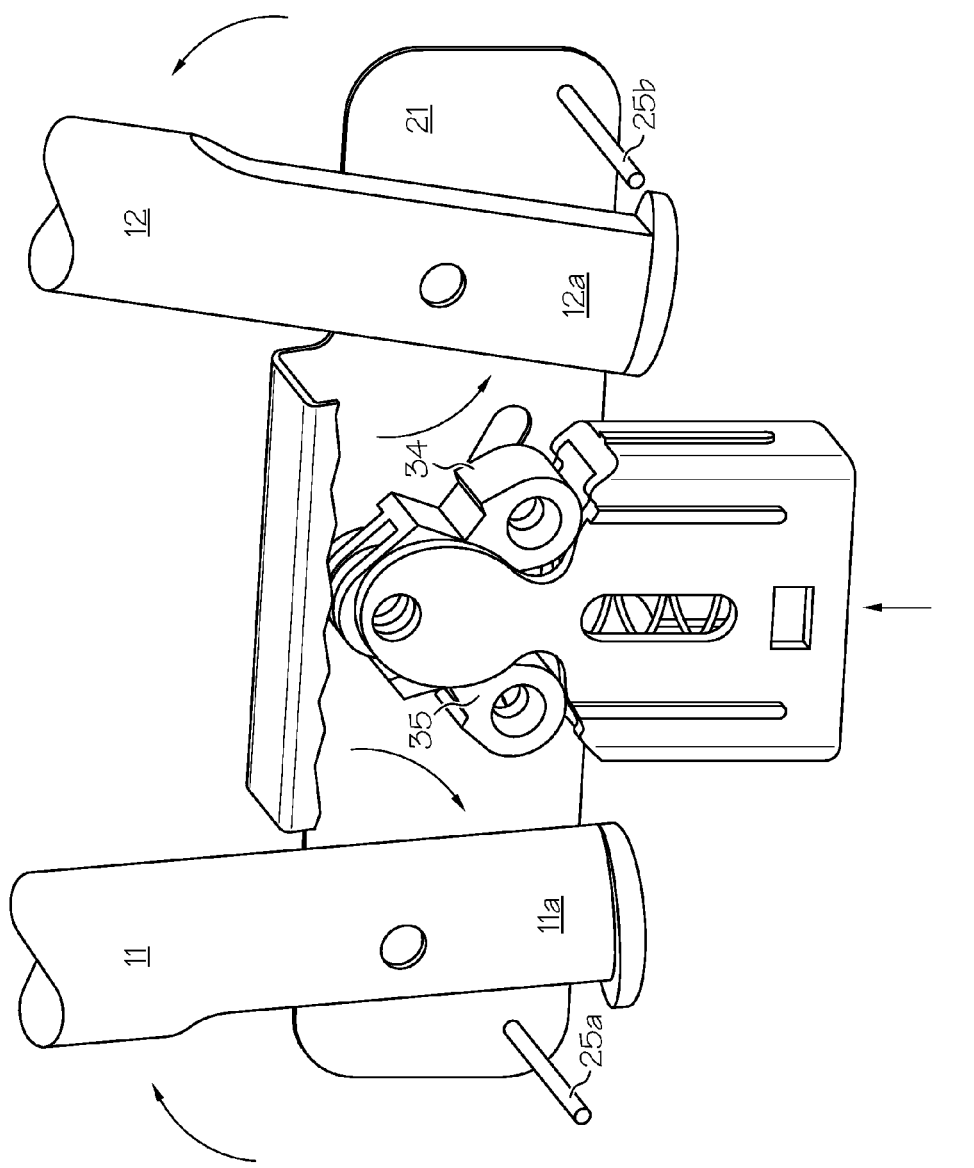
FIG. 2D is a partially cutaway perspective view of the locking hinge mechanism of FIG. 1A, with some items omitted for clarity of illustration, and showing the locking hinge mechanism unlocked and the tubular rails folded.
Figure 3:
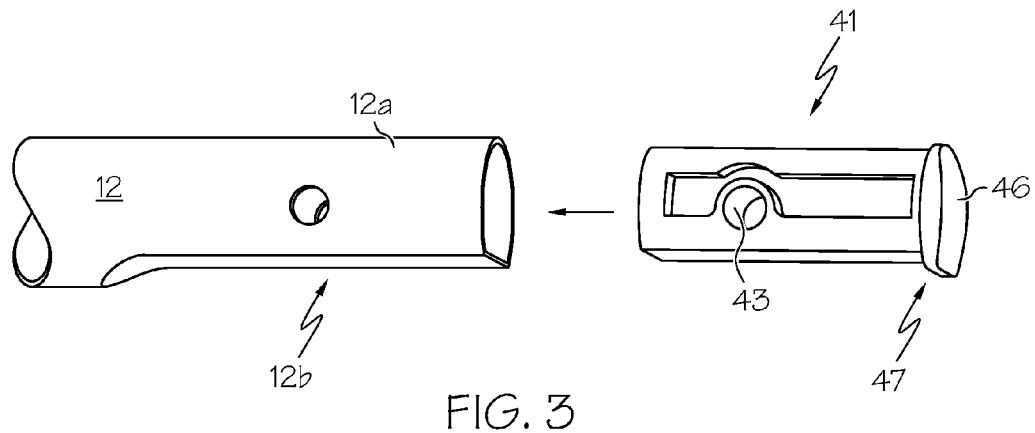
FIG. 3 is an exploded perspective view of a portion of the locking hinge mechanism of FIG. 1A.

As best seen in FIGS. 2A, 2B, with the lock assembly 30 in the locked configuration the distal ends 34b, 35b of the movable arms 34, 35 are positioned under the proximal portions 12a, 11a of the tubular rails 12, 11, thereby preventing the proximal portions 12a, 11a of the tubular rails 12, 11 from downward rotation relative to the housing 20. Also preferably, the movements of the movable arms 34, 35 of the lock assembly are constrained by the angled slots 28a, 27a formed in the housing 20, since the rails 12, 11 block upward movement of the arms 34, 35, thereby preventing upward and inward movement of lock pins 27, 28 along the angled slots that would allow the arms to move toward their inward unlocked positions. Thus, the both the angle of the slots and the fact that the movable arms 34, 35 are at their limits of movement in the slots tends to prevent further downward movement (rotation) of the proximal ends 12a, 11a of the tubular railings 12, 11.

Optionally, plastic rail inserts 41 are inserted into the proximal ends 11a, 12a of the tubular rails 11, 12 and the rail inserts 41 each include an elongate body 42, a pivot bore 43 formed in the body 42 and a tappet 44. The tappets 44 each include a smooth, curved surface 46 terminating in a lower pawl 47. Preferably the lock assembly 30 includes recesses 34c, 35c formed in the movable arms 34, 35 for releasably capturing the pawls 47 when the lock assembly 30 is locked. The ends of the tubular rails 11, 12 are D-shaped to have flats formed on the underside thereof extending from the proximal ends 12a, 11a of the tubular rails 12, 11 past the pivot bores 43 therein for approximately an equal distance therepast. These flat undersides of the rails provide additional clearance and a good surface for being supported (constrained) by the distal ends of the movable support arms.

In use, the device works as follows. The hinge connects two upper rails extending between corners of a playpen or play yard. Thus, the floor and sides of the playpen are suspended from the rails. Therefore, the weight of the floor and sides of the playpen pull down on the rails, so that in the normal position, the rails are perfectly parallel or slightly drooping. This causes the underside of the ends (the D-shaped parts) of the tubing to pivot slightly about the pivot axis of the tubular rails and push down on the upper surface of the distal ends of the folding A-shaped lock mechanism. This is what is shown in FIG. 2A.

To unlock the locking hinge, the user pulls up slightly on the hinge. Since the far ends of the rails are attached at the corners of the playpen, this causes the rails (tubing) to pivot up slightly about the pivot pins. With the D-shaped ends of the rails pivoted up and away from the ends of the folding A-shaped mechanism, a little clearance is made between the underside of the tubular railings and the upper surface of the distal ends of the movable support arms. This clearance provides sufficient room for the distal ends of support arms to move inwardly, drawing lock pins 27, 28 inward and upward along the angle paths of the slots 27a, 28a. So, the user first lifts slightly on the hinge and then squeezes the large button (lock button) upwardly, moving the A-shaped mechanism upwardly and moving the ends of the A-shaped mechanism inward and out from under the bottom of the tubing. See FIGS. 2B and 2C.

Figure 5:
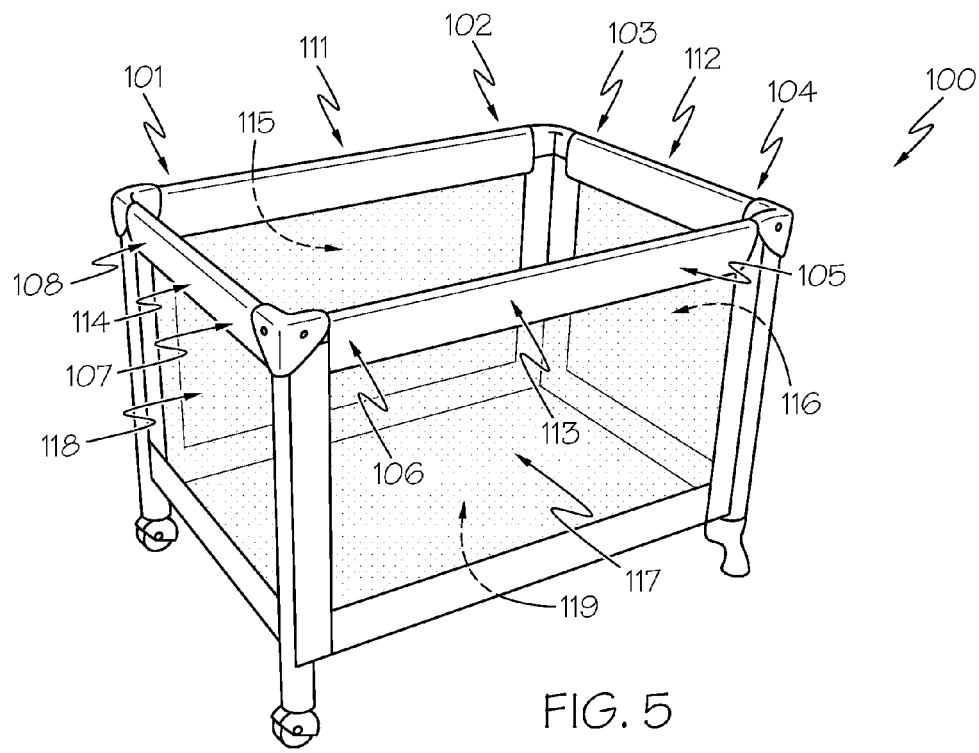
FIG. 5 is a perspective view of the playpen/play yard device incorporating several of the locking hinge mechanism of FIG. 1A, showing the playpen/play yard device in an extended configuration for use.
Figure 6:
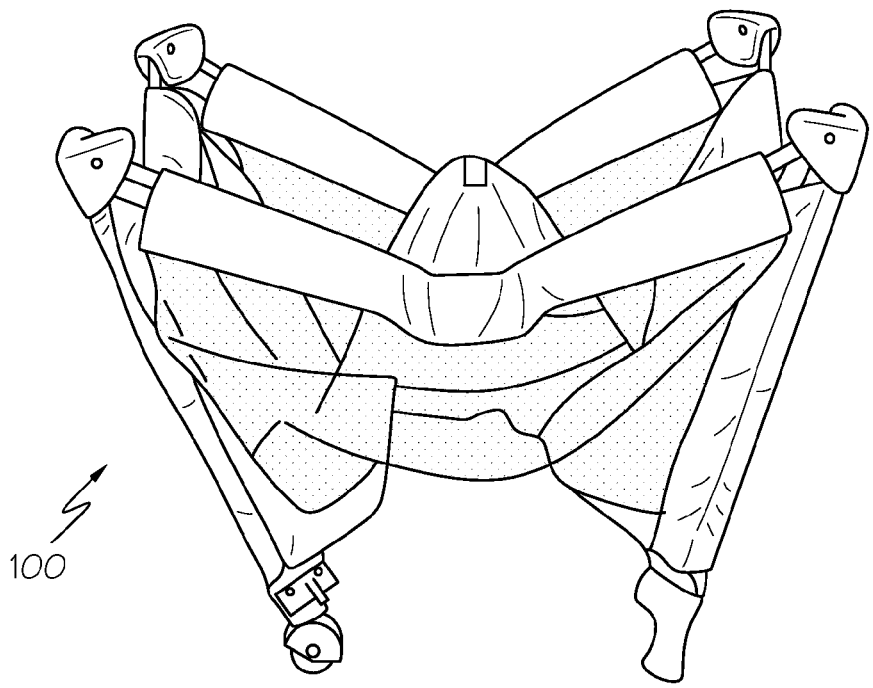
FIG. 6 is a perspective view of the playpen/play yard device incorporating several of the locking hinge mechanisms of FIG. 1A, showing the playpen/play yard device in an unlocked and partly folded configuration.
Figure 7:
FIG. 7 is a perspective view of the playpen/play yard device incorporating several of the locking hinge mechanisms of FIG. 1A, showing the playpen/play yard device in an unlocked and folded configuration for storage and/or transport.
Figure 8:
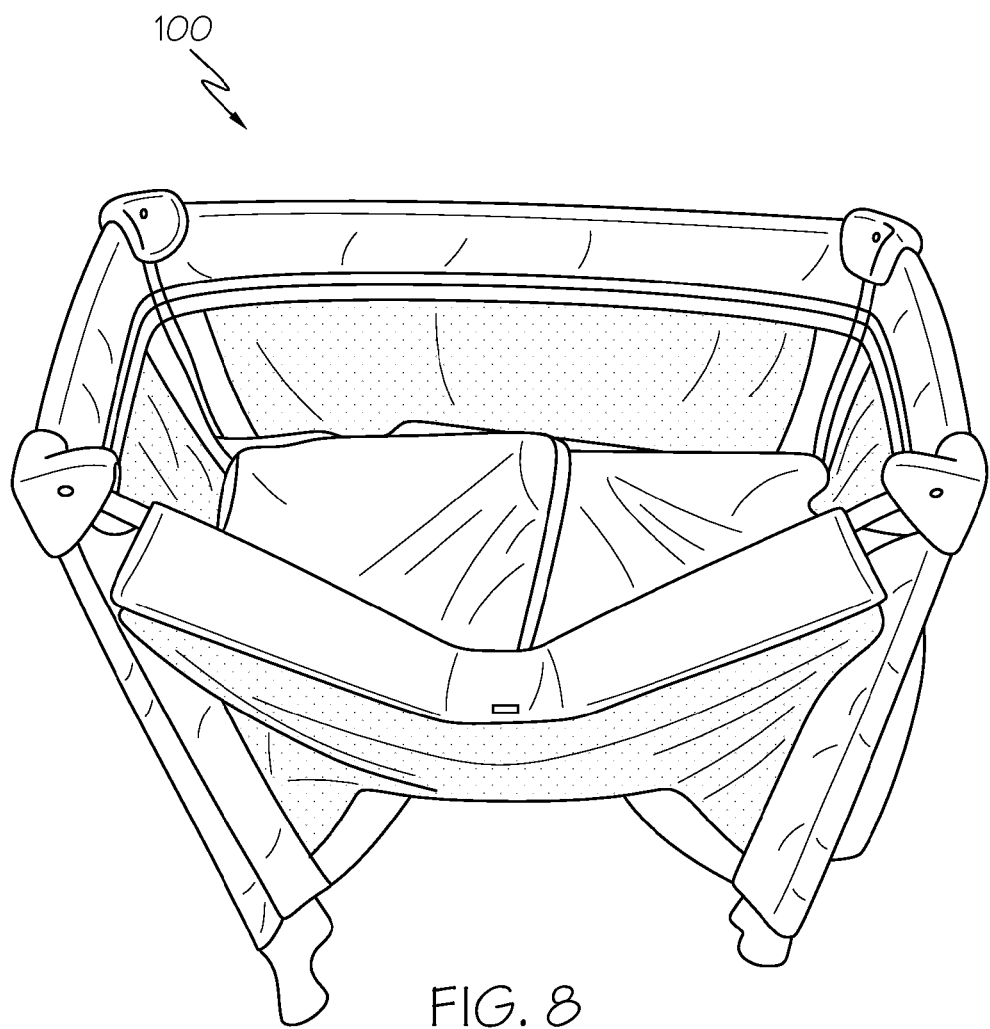
FIG. 8 is a perspective view of the playpen/play yard device incorporating several of the locking hinge mechanisms of FIG. 1A, showing the playpen/play yard device with one locking hinge unlocked and two rails folded.

In another preferred form, the present invention relates to a folding playpen or play yard incorporating a locking hinge assembly generally as described above. Such a playpen 100 is shown in FIG. 5 and includes a plurality of hinged tubular rails 101-108 (covered in this illustration by typical coverings) connected therebetween by four of the locking hinges at locations 111-114. The rails 101-108 support side panels 115-118 and a floor 119 (the lead-line arrowheads positioned in the approximate centers of the respective panels). Preferably the locking hinges each include a push button. Preferably, the locking hinges and the housing are configured and adapted to require the locking hinge assembly to be lifted slightly to provide some clearance to permit the first and second movable portions to be moved from the locked position in which the movable portions are positioned under the proximal portions of the tubular rails to the unlocked position in which the movable portions are not under the proximal portions of the tubular rails. FIG. 6 is a perspective view of the playpen/play yard device incorporating several of the locking hinge mechanisms of FIG. 1A, showing the playpen/play yard device in an unlocked and partly folded configuration. FIG. 7 is a perspective view of the playpen/play yard device 100 incorporating several of the locking hinge mechanisms, showing the playpen/play yard device in an unlocked and folded configuration for storage and/or transport. FIG. 8 is a perspective view of the playpen/play yard device incorporating several of the locking hinge mechanisms, showing the playpen/play yard device with one locking hinge unlocked and two rails folded.

While the invention has been described with reference to preferred and example embodiments, it will be understood by those skilled in the art that a variety of modifications, additions and deletions are within the scope of the invention, as defined by the following claims.

What is claimed is:

1. A locking hinge mechanism for a folding playpen or play yard frame having rails for supporting sides and a floor of the playpen or play yard, the locking hinge mechanism comprising:
a housing pivotally connected to the rails adjacent proximal portions thereof, wherein lifting the housing lifts the rails and induces the proximal portions of the rails to pivot upward relative to the housing; and
a lock assembly movable relative to the housing to engage the proximal portions of the rails, the lock assembly configured and adapted for locking and unlocking the rails relative to the housing, wherein the lock assembly and the housing are configured and adapted to require the locking hinge mechanism to be lifted to effect a limited pivotally upward motion of the proximal portions of the rails relative to the housing prior to unlocking the lock assembly, the lock assembly comprising first and second movable portions that are movable relative to the housing to lock and unlock the rails, that when locked prevent the proximal portions of the rails from pivoting downward relative to the housing, that when unlocked permit the proximal portions of the rails to pivot downward relative to the housing, and that when locked are positioned relative to the housing to define an oversized gap that permits the limited pivotally upward motion of the proximal portions of the rails relative to the housing into the gap to provide a clearance between the movable portions and the proximal portions of the rails, the first and second movable portions being coupled to the housing by a pair of lock pins, the lock pins movable along a pair of angularly inclined slots in the housing, the lock assembly further comprising a lock actuator which is operable to unlock the lock assembly only after the locking hinge mechanism is first lifted to effect the limited pivotally upward motion of the proximal portions of the rails relative to the housing to free the lock actuator to unlock the lock assembly and is prevented from unlocking the lock assembly when the locking hinge mechanism is not so lifted.

2. A locking hinge mechanism as claimed in claim 1 wherein movements of the first and second movable portions of the lock assembly are constrained by first and second slots formed in the housing.

3. A locking hinge mechanism as claimed in claim 2 wherein the first and second slots formed in the housing are each positioned at a non-zero angle relative to a horizontal axis of the housing.

4. A locking hinge mechanism as claimed in claim 2 wherein the first and second slots formed in the housing are each positioned at an angle of between about 5 and 20 degrees relative to a horizontal axis of the housing.

5. A locking hinge mechanism as claimed in claim 1 further comprising rail inserts inserted into the proximal ends of the rails and wherein the rail inserts each include a pawl, and wherein the lock assembly includes recesses for releasably capturing the pawls when the lock assembly is locked.

6. A locking hinge mechanism as claimed in claim 1 wherein when unlocked the lock assembly permits the proximal portions of the rails to rotate downward relative to the housing to fold the playpen or play yard frame.

7. The folding playpen or play yard of claim 1 wherein the housing is pivotally connected to the rails closer to the proximal portions thereof than distal portions thereof, wherein lifting the housing lifts the rails and the effect of gravity on the rail distal portions causes the rail proximal portions to pivot upward.

8. The folding playpen or play yard of claim 1 wherein lifting the rails, by lifting the housing, in turn lifts portions of the rail-supported sides and floor of the playpen or play yard.

9. The folding playpen or play yard of claim 1 wherein when locked the first and second movable portions are positioned under the proximal portions of the rails.

10. The folding playpen or play yard of claim 1 wherein when locked the proximal portions of the rails engage the first and second movable portions and thereby prevent the first and second movable portions from moving to unlock the rails.

11. A locking hinge mechanism for a folding playpen or play yard frame having rails for supporting sides and a floor of the playpen or play yard, the locking hinge mechanism comprising:
a housing pivotally connected to the rails adjacent proximal portions thereof, wherein lifting the housing lifts the rails and induces the proximal portions of the rails to rotate upward relative to the housing; and
a lock assembly movable relative to the housing to engage the proximal portions of the rails, the lock assembly for locking and unlocking the rails relative to the housing, the lock assembly including a lock release and first and second movable portions movable between a locked position in which the movable portions are positioned under the proximal portions of the rails preventing the proximal portions of the rails from downward rotation relative to the housing and an unlocked position in which the movable portions are not under the proximal portions of the rails, the first and second movable portions movably mounted to the housing by a pair of lock pins that ride along a pair of generally inwardly and upwardly inclined slots formed in the housing, the lock assembly including a biasing element for biasing the first and second movable portions toward the locked position, wherein in the locked position the movable portions are positioned relative to the housing to define a gap that permits a limited rotationally upward motion of the proximal portions of the rails relative to the housing, and wherein the lock assembly movable portions and the housing are configured and adapted to require the locking hinge mechanism to be lifted to induce the limited rotationally upward motion of the proximal portions of the rails relative to the housing and into the gap to provide a clearance between the movable portions and the proximal portions of the rails to only then permit the first and second movable portions to be moved from the locked position in which the movable portions are positioned under the proximal portions of the rails to the unlocked position in which the movable portions are not positioned under the proximal portions of the rails.

12. A locking hinge mechanism as claimed in claim 11 further comprising rail inserts inserted into the proximal ends of the rails and wherein the rail inserts each include a pawl, and wherein the lock assembly includes recesses for releasably capturing the pawls when the lock assembly is locked.

13. A locking hinge mechanism as claimed in claim 11 wherein movements of the first and second movable portions of the lock assembly are constrained by first and second slots formed in the housing.

14. A locking hinge mechanism as claimed in claim 13 wherein the first and second slots formed in the housing are each positioned at a non-zero angle relative to a horizontal axis of the housing.

15. A locking hinge mechanism as claimed in claim 13 wherein the first and second slots formed in the housing are each positioned at an angle of between about 5 and 20 degrees relative to the horizontal axis of the housing.

16. A folding playpen or play yard comprising:
a plurality of rails;
side panels and a floor supported by the plurality of rails; and
a locking hinge mechanism including a housing and a locking assembly,
wherein the housing is pivotally connected to two of the rails adjacent proximal portions thereof, wherein actuating the housing lifts the two pivotally connected rails and induces the respective rail proximal portions to pivot upward relative to the housing,
wherein the lock assembly includes two movable portions that are movable relative to the housing between a locked position and an unlocked position, that in the locked position prevent the rail proximal portions from pivoting downward relative to the housing, and that in the unlocked position permit the rail proximal portions to pivot downward relative to the housing, the two movable portions being movably connected to the housing by a pair of lock pins, the lock pins riding within a pair of inwardly and upwardly angled slots to constrain the movement of the lock pins to an angled translation motion,
wherein in the locked position the relative position of the lock movable portions and the housing defines a gap that permits a limited pivotally upward motion of the rail proximal portions relative to the housing into the gap to provide a clearance between the lock movable portions and the rail proximal portions, and
wherein the lock assembly includes a lock actuator that is operable to move the lock movable portions from the locked position to the unlocked position but only after the housing is first actuated to effect the limited pivotally upward motion of the rail proximal portions relative to the housing into the gap to provide the clearance to unlock the lock assembly and that is prevented from moving the lock movable portions from the locked position to the unlocked position when the housing is not so lifted.

17. The folding playpen or play yard of claim 16 wherein the housing is pivotally connected to the rails closer to the proximal portions thereof than distal portions thereof, wherein lifting the housing lifts the rails and the effect of gravity on the rail distal portions causes the rail proximal portions to pivot upward.

18. The folding playpen or play yard of claim 16 wherein lifting the rails, by lifting the housing, in turn lifts portions of the rail-supported sides and floor of the playpen or play yard.

19. The folding playpen or play yard of claim 16 wherein in the locked position the lock movable portions are positioned under the rail proximal portions.

20. The folding playpen or play yard of claim 16 wherein in the locked position the rail proximal portions engage the lock movable portions and thereby prevent the lock movable portions from moving from the locked position to the unlocked position.

* * * * *